US010308795B2

(12) United States Patent
Wang et al.

(10) Patent No.: US 10,308,795 B2
(45) Date of Patent: Jun. 4, 2019

(54) HETEROPHASIC POLYPROPYLENE WITH IMPROVED STIFFNESS/IMPACT BALANCE

(71) Applicant: Borealis AG, Vienna (AT)

(72) Inventors: Jingbo Wang, Linz (AT); Pauli Leskinen, Helsinki (FI); Johanna Lilja, Porvoo (FI); Markus Gahleitner, Neuhofen/Krems (AT)

(73) Assignee: BOREALIS AG, Vienna (AT)

( * ) Notice: Subject to any disclaimer, the term of this patent is extended or adjusted under 35 U.S.C. 154(b) by 13 days.

(21) Appl. No.: 15/521,179

(22) PCT Filed: Oct. 16, 2015

(86) PCT No.: PCT/EP2015/073955
§ 371 (c)(1),
(2) Date: Apr. 21, 2017

(87) PCT Pub. No.: WO2016/066446
PCT Pub. Date: Jun. 5, 2016

(65) Prior Publication Data
US 2017/0313866 A1 Nov. 2, 2017

(30) Foreign Application Priority Data
Oct. 27, 2014 (EP) .................................... 14190436

(51) Int. Cl.
C08F 2/00 (2006.01)
C08J 5/18 (2006.01)
C08K 5/00 (2006.01)
C08F 4/649 (2006.01)
C08F 4/651 (2006.01)
C08L 23/08 (2006.01)
C08L 23/12 (2006.01)
C08L 23/26 (2006.01)
C08F 210/06 (2006.01)
C08F 210/16 (2006.01)
C08L 23/16 (2006.01)

(52) U.S. Cl.
CPC ............. *C08L 23/12* (2013.01); *C08F 2/001* (2013.01); *C08F 4/6492* (2013.01); *C08F 4/651* (2013.01); *C08F 210/06* (2013.01); *C08J 5/18* (2013.01); *C08K 5/0083* (2013.01); *C08L 23/0815* (2013.01); *C08L 23/16* (2013.01); *C08F 210/16* (2013.01); *C08F 2500/12* (2013.01); *C08F 2500/15* (2013.01); *C08F 2500/17* (2013.01); *C08J 2323/12* (2013.01); *C08J 2423/08* (2013.01); *C08J 2423/14* (2013.01); *C08L 2205/02* (2013.01); *C08L 2205/03* (2013.01); *C08L 2205/24* (2013.01); *C08L 2207/02* (2013.01); *C08L 2207/06* (2013.01); *C08L 2308/00* (2013.01); *C08L 2314/02* (2013.01)

(58) Field of Classification Search
CPC ...... C08L 23/12; C08L 23/16; C08L 23/0815; C08L 2205/02; C08L 2207/06; C08L 2205/03; C08L 2205/24; C08L 2207/02; C08L 2308/00; C08L 2314/02; C08K 5/0083; C08J 5/18; C08J 2323/12; C08J 2423/08; C08J 2423/14; C08F 210/06; C08F 4/651; C08F 4/6492; C08F 2/001; C08F 210/16; C08F 2500/12; C08F 2500/15; C08F 2500/17
USPC .......................................................... 524/451
See application file for complete search history.

(56) References Cited

U.S. PATENT DOCUMENTS 9,890,274 B2 * 2/2018 Wang ..................... C08L 23/12

FOREIGN PATENT DOCUMENTS

| EP | 586390 | 3/1994 |
|----|--------|--------|
| EP | 491566 B1 | 2/1998 |
| EP | 591224 B1 | 2/1998 |
| EP | 0887379 A1 | 12/1998 |
| EP | 1659151 A1 | 5/2006 |
| EP | 1801156 A1 | 6/2007 |
| EP | 1358266 B1 | 11/2007 |
| EP | 2154194 A1 | 2/2010 |
| EP | 2610271 A1 | 7/2013 |
| EP | 2610272 A1 | 7/2013 |
| EP | 2610273 A1 | 7/2013 |
| WO | 99/12182 A1 | 7/1992 |
| WO | 99/24478 | 5/1995 |
| WO | 99/24479 A1 | 5/1999 |
| WO | 99/24501 A1 | 5/1999 |
| WO | 00/168315 A1 | 11/2000 |
| WO | 2004/000899 A1 | 12/2003 |
| WO | 2004/111095 A1 | 12/2004 |
| WO | 2006/125720 A1 | 11/2006 |
| WO | 2009/129873 A1 | 10/2009 |
| WO | 2010/049448 A1 | 5/2010 |
| WO | 2012/007430 A1 | 1/2012 |
| WO | 2013/010877 A1 | 1/2013 |

OTHER PUBLICATIONS

V. Busico, et al., "Full Assignment of the 13C NMR Spectra of Regioregular Polypropylenes: Methyl and Methylene Region", Macromolecules 1997, pp. 6251-6263.

(Continued)

*Primary Examiner* — Angela C Scott
(74) *Attorney, Agent, or Firm* — Tarolli, Sundheim, Covell & Tummino LLP

(57) ABSTRACT

Heterophasic polypropylene composition with an advantageous, respectively stiffness/impact balance and its use.

11 Claims, 1 Drawing Sheet

(56) References Cited

OTHER PUBLICATIONS

V. Busico, et al., "Microstructure of polypropylene", Progress in Polymer Science, 2001, pp. 443-533.
V. Busico, et al., "Alk-1-ene Polymerization in the Presence of a Monocyclopentadienyl Zirconium(IV) Acetamidinate catalyst: Microstructural and Mechanistic Insightsa", Macromol. Rapid Commun. 2007, pp. 1128-1134.
H.N. Cheng, et al., "13C NMR Analysis of Ethylene-Propylene Rubbers", Macromolecules 1984, 99. 1950-1955.
M. Kakugo, et al., "13C NMR Determination of Monomer Sequence Distribution in Ethylene-Propylene Copolymers Prepared with δ-TiCl3-Al(C2H5)2Cl", Macromolecules 1982, pp. 1160-1162.
L. Resconi, "Selectivity in Propene Polymerization with Metallocene Catalysts", Chemical Reviews, 2000, pp. 1253-1345.
G. Singh, et al., "Triad sequence determination of ethylene—propylene copolymers—application of quantitative 13C NMR", Polymer Testing, 2009, pp. 475-479.
W.J. Wang, et al., "Structural Analysis of Ethylene/Propylene Copolymers Synthesized with a Constrained Geometry catalyst", Macromolecules 2000, pp. 1157-1162.
Z. Zhou, et al., "A new decoupling method for accurate quantification of polyethylene copolymer composition and triad sequence distribution with 13C NMR", Journal of Magnetic Resonance, 2007, pp. 225-233.

* cited by examiner

Figure 1: Relation of Flexural Modulus to XCS
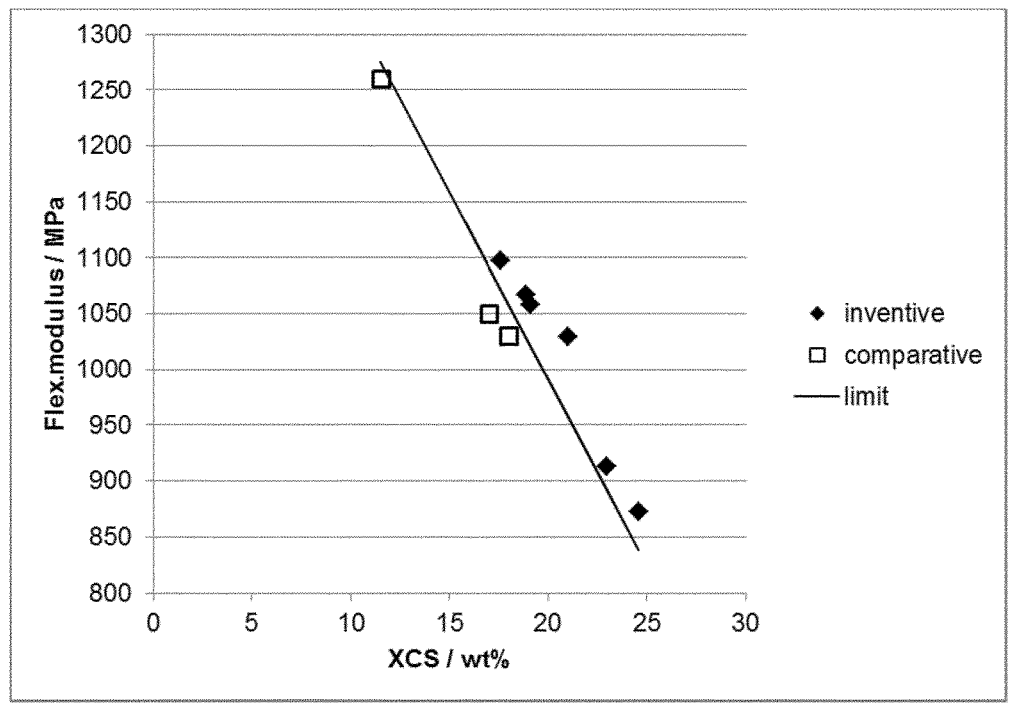
Figure 2: Relation of VOC to MFR
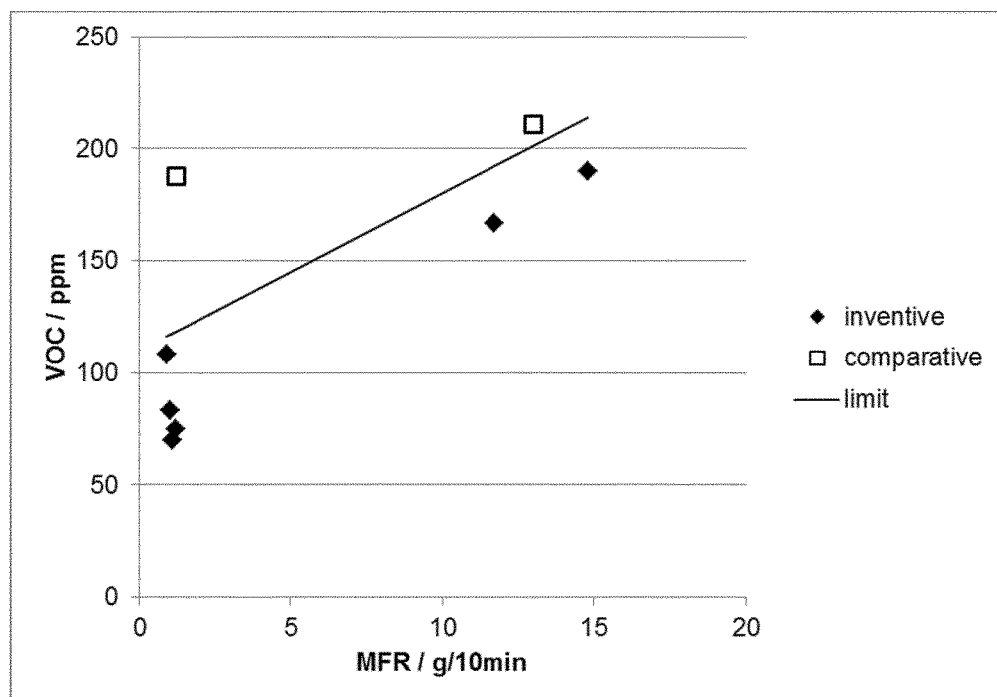

HETEROPHASIC POLYPROPYLENE WITH IMPROVED STIFFNESS/IMPACT BALANCE

The present invention relates to a heterophasic polypropylene composition with an advantageous respectively improved stiffness/impact balance. Further, the present invention is also directed to an article made of the inventive polypropylene composition, particularly a film, an extruded, blow moulded or injection moulded article. Finally, the present invention is also directed to the use of the inventive polypropylene composition for the production of films, extruded, blow moulded or injection moulded articles, such as pouches and bags, pipes and fittings, transport packaging containers as well as components for car exteriors and interiors, like dashboards, door claddings, consoles, bumpers and trims.

BACKGROUND

Polymers, like polypropylene, are increasingly used in different demanding applications. At the same time there is a continuous search for tailored polymers which meet the requirements of these applications. The demands can be challenging, since many polymer properties are directly or indirectly interrelated, i.e. improving a specific property can only be accomplished on the expense of another property. Stiffness can for instance be improved by increasing the crystallinity and/or the relative amount of homopolymer within the composition. As a consequence, the material becomes more brittle, thereby resulting in poor impact properties. It is known that impact strength of polypropylene can be improved by dispersing a rubber phase within the polymer matrix, thereby obtaining a heterophasic polypropylene composition.

BRIEF DESCRIPTION OF THE DRAWINGS

FIG. 1 illustrates a plot the relation of Flexural Modulus to XCS.

FIG. 2 illustrates a plot the relation of VOC to MFR.

Such heterophasic propylene copolymers comprise a matrix being either a propylene homopolymer or a random propylene copolymer in which an amorphous phase, which contains a propylene copolymer rubber (elastomer), is dispersed. Thus the polypropylene matrix contains (finely) dispersed inclusions not being part of the matrix and said inclusions contain the elastomer. The term inclusion indicates that the matrix and the inclusion form different phases within the heterophasic propylene copolymer, said inclusions are for instance visible by high resolution microscopy, like electron microscopy or scanning force microscopy or atomic force microscopy, or by dynamic mechanical thermal analysis (DMTA). Further the heterophasic polypropylene may contain to some extent a crystalline polyethylene, which is a by-reaction product obtained by the preparation of the heterophasic propylene copolymer. Such crystalline polyethylene is present as inclusion of the amorphous phase due to thermodynamic reasons.

Many different types of heterophasic systems have been described depending on the individual desire.

From WO 2009/129873 heterophasic propylene copolymers with high purity, which is shown in reduced volatiles content, reduced fogging and reduced hexane-solubles content, are known. These high purity heterophasic copolymers are prepared with a multi-step polymerization procedure in the presence of a special Ziegler-Natta procatalyst which contains a trans-esterification product of a lower alcohol and a phthalic ester in combination with a special external donor. There is, however, a common market request for polymers being free of phthalic acid compounds.

From WO 2010/049448 further heterophasic propylene copolymers are known. These high purity heterophasic propylene copolymers are also prepared with a multi-step polymerization procedure in the presence of a special Ziegler-Natta procatalyst which contains a trans-esterification product of a lower alcohol and a phthalic ester in combination with a special external donor. The products described in this application however have limited impact strength.

EP 1358266 A1 discloses a heterophasic polypropylene composition for packaging applications with improved optical properties and improved impact strength comprising a propylene homo- or copolymer matrix phase, a dispersed elastomeric ethylene-propylene copolymer phase and as a modifier a low density ethylene polymer component. Nucleating agents are optional additives. EP 1358266 A1 is silent about volatiles and fogging.

EP 1659151 A1 discloses a heterophasic polypropylene composition comprising a propylene homo- or copolymer matrix phase and a dispersed phase which comprises two elastomeric ethylene-propylene copolymer fractions which differ in ethylene content and intrinsic viscosity. Said composition further comprises a low density ethylene copolymer with an ethylene content of at least 80 mol %. Nucleation with known α-nucleating agents is an option. Said compositions are suitable for moulding and have a good balance between impact strength and stiffness, sufficient flowability and good optical properties. Also EP 1659151 A1 is silent about volatiles and fogging.

EP 1801156 A1 discloses a heterophasic polypropylene composition comprising a propylene homo- and/or copolymer matrix phase, a dispersed elastomeric ethylene-propylene copolymer phase and a low density ethylene copolymer component. A particular type of nucleating agent, namely a polymeric nucleating agent is disclosed to be essential. Said compositions are suitable for thermoforming and thin wall packaging and have good transparency. Again, volatiles and fogging are not mentioned.

Although a lot of development work has been done in the field of heterophasic polypropylene compositions, it was up to now not possible to find a well-balanced polymer composition with respect to toughness and impact in combination with reduced emissions (low volatiles and low fogging).

Therefore, there is still a need for a heterophasic polypropylene composition which while keeping acceptable (low temperature) impact resistance has high toughness/stiffness and reduced emissions, i.e. low volatiles and low fogging.

Hence, it is an object of the present invention to provide such a material.

SUMMARY OF THE INVENTION

The present invention is based on the finding that the above-mentioned objects can be achieved by a particular heterophasic polypropylene composition comprising:

(A) 70 to 90 wt % of a crystalline isotactic propylene homopolymer matrix having a pentad concentration as determined by $^{13}$C-NMR spectroscopy of more than 96 mol % and a matrix melt flow rate (MFR$_M$) as determined at 230° C. and 2.16 kg load according ISO 1133 in the range of 0.5 to 50 g/10 min, (B) 10 to 30 wt % of a predominantly amorphous propylene copolymer with 32 to 50 wt % of ethylene and/or an α-olefin with 4-10 carbon atoms, being present in the composition as dispersed particles, and (C) 0 to 5.0 wt % of a crystalline ethylene copolymer with an α-olefin with 3-10 carbon atoms being present in the composition as inclusions of the dispersed particles of (B), (D) 0 to 1.0 wt % of an alpha nucleating agent for the α- and/or γ-phase of isotactic polypropylene said composition being further characterized by a total melt flow rate ($MFR_T$) as determined at 230° C. and 2.16 kg load according ISO 1133 in the range of 0.5 to 45 g/10 min, a fraction soluble in xylene (XCS) determined at 25° C. according ISO 16152 in the range of 11 to 27 wt %, and a ratio of $MFR_T/MFR_M$ of ≤1.0.

The sum of the percentage amounts of the individual components of the composition is equal to 100 percent.

The special combination of especially Components (A) and (B) gives rise to compositions having improved toughness/impact balance as well as reduced emissions, i.e. low volatiles and low fogging compared to other heterophasic polypropylene compositions.

In a first embodiment of the present invention, the heterophasic polypropylene composition is free of phthalic acid esters as well as their respective decomposition products; preferably the heterophasic polypropylene composition is free of phthalic compounds as well as their respective decomposition products.

According to the present invention the term "phthalic compounds" refers to phthalic acid (CAS No. 88-99-3), its mono- and diesters with aliphatic, alicyclic and aromatic alcohols as well as phthalic anhydride.

In a further aspect the invention is related to the use of the composition for the production of films, extruded, blow moulded or injection moulded articles, such as pouches and bags, pipes and fittings, transport packaging containers as well as components for car exteriors and interiors, like dashboards, door claddings, consoles, bumpers and trims.

In yet a further aspect the invention is directed to an article made of the inventive polypropylene composition, particularly a film or an extruded, blow moulded or injection moulded article.

DETAILED DESCRIPTION

In the following the individual components are defined in more detail.

The particular heterophasic polypropylene composition of the present invention comprises at least component (A) and component (B).

Ad Component (A):

Component (A) of the particular heterophasic polypropylene composition is a crystalline isotactic propylene homopolymer forming the matrix of the heterophasic polypropylene composition.

The expression homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable.

The propylene homopolymer matrix is isotactic having a high pentad concentration, i.e. higher than 96 mol %, like a pentad concentration of at least 96.3 mol %. The pentad concentration is preferably at least 96.5 mol % up to 99.9% and more preferably at least 96.7 mol % to 99.8%.

The propylene homopolymer matrix has a melt flow rate $MFR_2$ (ISO 1133; 230° C.; 2.16 kg) in the range of 0.5 to 50 g/10 min, preferably in the range of 0.7 to 45 g/10 min and more preferably in the range of 0.9 to 42 g/10 min.

The $MFR_2$ of the matrix is named matrix melt flow rate ($MFR_M$).

Moreover it is preferred that the amount of xylene solubles of the propylene homopolymer matrix is not too high. Xylene solubles are the part of the polymer soluble in cold xylene determined by dissolution in boiling xylene and letting the insoluble part crystallize from the cooling solution (determined at 25° C. according to ISO 16152). The xylene solubles fraction contains polymer chains of low stereo-regularity and is an indication for the amount of non-crystalline areas. Accordingly it is preferred that the xylene solubles fraction of the propylene homopolymer matrix is in the range of 0.5 wt % to 3.0 wt %, more preferably in the range of 0.7 wt % to 2.5 wt %. In an even more preferred embodiment the xylene solubles fraction is in the range of 0.8 wt % to 2.3 wt %.

The propylene homopolymer has a melting temperature $T_{m1}$ and a melting enthalpy $H_{m1}$ as determined by DSC analysis according to ISO 11357.

Preferably, $T_{m1}$ of the propylene homopolymer is within the range of 160° C. to 170° C., more preferably within the range of 161° C. to 169° C. and most preferably within the range of 162° C. to 168° C.

Preferably, $H_{m1}$ of the propylene homopolymer is in the range of 70 to 100 J/g, more preferably in the range of 70 to 95 J/g and most preferably within the range of 70 to 92 J/g.

The propylene homopolymer matrix can be unimodal or multimodal, like bimodal.

Preferably the propylene homopolymer matrix is multimodal, especially bimodal.

Concerning the definition of unimodal and multimodal, like bimodal, it is referred to the definition below.

Where the propylene homopolymer matrix comprises two or more different propylene polymers these may be polymers with different monomer make up and/or with different molecular weight distributions. These components may have identical or differing monomer compositions and tacticities.

When the propylene homopolymer matrix phase is unimodal with respect to the molecular weight distribution, it may be prepared in a single stage process e.g. a slurry or gas phase process in a slurry or gas phase reactor. Preferably, a unimodal matrix phase is polymerized as a slurry polymerization. Alternatively, the unimodal matrix may be produced in a multistage process using at each stage process conditions which result in similar polymer properties.

The propylene homopolymer matrix, if it is of multimodal or bimodal character, can be produced by blending different polymer types, i.e. of different molecular weight and/or comonomer content. However in such a case it is preferred that the polymer components of the polypropylene matrix are produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Ad Component (B):

Component (B) of the particular heterophasic polypropylene composition is a predominantly amorphous propylene copolymer being present in the composition as dispersed particles. (i.e. dispersed phase)

Suitable comonomers for the propylene copolymer are ethylene and/or α-olefins with 4-10 carbon atoms.

Suitable $C_4$-$C_{10}$ α-olefins are 1-butene, 1-pentene, 1-hexene, 1-heptene and 1-octene.

Preferably the component (B) is a copolymer of propylene and ethylene.

The amount of ethylene and/or α-olefins with 4-10 carbon atoms in component (B) is in the range of 32 to 50 wt %, preferably in the range of 34 to 50 wt %, like in the range of 36 to 50 wt %.

Like the propylene homopolymer matrix, the dispersed phase can be unimodal or multimodal, like bimodal.

In one embodiment, dispersed phase is unimodal. More particularly, the dispersed phase is preferably unimodal in view of the intrinsic viscosity and/or the comonomer distribution.

Concerning the definition of unimodal and multimodal, like bimodal, it is referred to the definition above.

Ad Component (C)

As component (C) a crystalline ethylene copolymer with an α-olefin with 3-10 carbon atoms is optionally present.

α-olefins with 3-10 carbon atoms are for example propylene, 1-butene, 1-pentene, 1-hexene, 1-heptene and 1-octene.

The crystalline ethylene copolymer is a by-reaction product obtained by the preparation of the heterophasic polypropylene composition. Such crystalline ethylene copolymer is present as inclusion in the amorphous phase due to thermodynamic reasons.

The crystalline ethylene copolymer has a melting temperature $T_{m2}$ and a melting enthalpy $H_{m2}$ as determined by DSC analysis according to ISO 11357.

Preferably, $T_{m2}$ of the crystalline ethylene copolymer is within the range of 105° C. to 130° C., more preferably within the range of 110° C. to 127° C. and most preferably within the range of 112° C. to 124° C.

Preferably, $H_{m2}$ of the crystalline ethylene copolymer is less than 7 J/g, more preferably less than 6 J/g and most preferably less than 5 J/g.

Ad Component (D)

As component (D) an alpha nucleating agent for the α- and/or γ-phase of the isotactic polypropylene is optionally present.

It is well known that different types of crystal nucleating agents will affect the crystal structure of the polymer differently, enhancing the presence and relative amounts of specific crystal modifications of isotactic polypropylene, like the monoclinic α-modification, the pseudo-hexagonal β-modification and the orthorhombic γ-modification.

While the polymer structure will affect the degree of expression of a specific nucleation, the type of crystal formed will be determined by the nucleating agent.

The alpha-nucleating agent (D), if present, is usually added in small amounts of 0.0001 to 1.0 wt %, preferably from 0.0005 to 0.8 wt % and more preferably from 0.001 to 0.5 wt %.

The α-nucleating agent (D) may be any compound which acts as nucleating agent for the monoclinic α-modification and/or orthorhombic γ-modification of polypropylene.

Generally speaking, two classes of α-nucleating agents can be distinguished, namely particulate nucleating agents and soluble nucleating agents.

Particulate nucleating agents show a conventional dispersion mechanism for which particle size and polarity difference to the polymer are decisive. Examples of this class are inorganic nucleating agents like talc, but also organic nucleating agents like sodium benzoate, organophosphates and salts of p-tert.-butyl benzoic acid, as well as polymeric nucleating agents like polymerized vinyl compounds such as polyvinylcyclohexane or polytetrafluoroethylene. Further details about these nucleating agents can be found e.g. in WO 99/24479 and WO 99/24501.

Soluble nucleating agents are those with a sequence of dissolution upon heating and recrystallisation upon cooling defining the degree of dispersion. In the latter case, solubility and the resulting crystal shape are decisive for the efficiency. Examples of this class are nucleating agents like sorbitol derivatives, e.g. di(alkylbenzylidene)sorbitols as 1,3:2,4-25 dibenzylidene sorbitol, 1,3:2,4-di(4-methylbenzylidene) sorbitol, 1,3:2,4-di(4-ethylbenzylidene) sorbitol and 1,3:2,4-Bis(3,4-dimethylbenzylidene) sorbitol, as well as nonitol derivatives, e.g. 1,2,3-trideoxy-4,6;5,7-bis-O-[(4-propylphenyl)methylene] nonitol, and benzene-trisamides like substituted 1,3,5-benzenetrisamides as N,N',N"-tris-tert-butyl-1,3,5-benzenetricarboxamide, N,N',N"-tris-cyclohexyl-1,3,5-benzene-tricarboxamide and N-[3,5-bis-(2,2-dimethyl-propionylamino)-phenyl]-2,2-dimethyl-propionamide.

However, in case the heterophasic polypropylene composition comprises an α-nucleating agent, the heterophasic polypropylene composition preferably has a crystallization temperature being above the crystallization temperature of the non-nucleated heterophasic polypropylene composition, whereby the crystallization temperature of the nucleated heterophasic polypropylene composition is more than 120° C. determined by DSC analysis according ISO 11357.

Ad Heterophasic Composition

The heterophasic polypropylene composition of the present inventions is further characterized by a total melt flow rate ($MFR_T$) (ISO 1133; 230° C.; 2.16 kg) in the range of 0.5 to 45 g/10 min, preferably in the range of 0.6 to 35 g/10 min, more preferably in the range of 0.7 to 30 g/10 min and even more preferably in the range of 0.8 to 25 g/10 min.

The ratio of the total melt flow rate of the heterophasic polypropylene composition to the propylene homopolymer matrix melt flow rate $MFR_T/MFR_M$ is ≤1.0.

Preferably the ratio $MFR_T/MFR_M$ is in the range of 0.3 to 1.0, more preferably in the range of 0.4 to 0.9.

The xylene cold soluble (XCS) fraction measured according to according ISO 16152 (25° C.) of the heterophasic polypropylene composition is in the range from 11.0 to 27.0 wt %, preferably in the range from 13.0 to 27.0 wt % and more preferably in the range from 14.0 to 26.0 wt %.

Further it is appreciated that the xylene cold soluble (XCS) fraction of the heterophasic polypropylene composition is specified by its intrinsic viscosity.

For the present invention it is appreciated that the xylene cold soluble fraction (XCS) of the heterophasic polypropylene composition has an intrinsic viscosity (iV) measured according to ISO 1628/1 (at 135° C. in decalin) in the range of 1.2 to below 4.5 dl/g, preferably in the range of 1.5 to 4.0 dl/g and more preferably in the range of 1.7 to below 3.8 dl/g.

Additionally it is preferred that the comonomer content, preferably ethylene content, of the xylene cold soluble (XCS) fraction of the heterophasic polypropylene composition is in the range of 35.0 to 52.0 wt %, preferably in the range of 37.0 to 52.0 wt %, and more preferably in the range of 39.0 to 50.0 wt %.

The comonomers present in the xylene cold soluble (XCS) fraction are those defined above for the propylene copolymer (component B). In one preferred embodiment the comonomer is ethylene only.

It is also appreciated that the total content of the comonomers, i.e. the sum of content of ethylene and α-olefins with 4 to 10 C-atoms, in the total heterophasic polypropylene composition is rather moderate.

Accordingly it is preferred that the heterophasic polypropylene composition has a total comonomer content, preferably ethylene content, in the range of 3.5 to 17.0 wt %, preferably in the range of 4.0 to 16.5 wt % and more preferably in the range of 4.5 to 16.2 wt %.

Furthermore the inventive heterophasic polypropylene composition has at least a first glass transition temperature $T_g(1)$ and a second glass transition temperature $T_g(2)$, wherein said first glass transition temperature $T_g(1)$ is above the second glass transition temperature $T_g(2)$. The glass transition temperature $T_g$ is determined by dynamic mechanical thermal analysis (DMTA) according to ISO 6721-7.

Accordingly the heterophasic polypropylene composition has a first glass transition temperature $T_g(1)$ in the range of −4 to +4° C. and a second glass transition temperature $T_g(2)$ in the range of −65 to −50° C.

The multiphase structure of the heterophasic polypropylene composition (predominantly amorphous propylene copolymer dispersed in the matrix) can be identified by the presence of at least two distinct glass transition temperatures. The higher first glass transition temperature $(T_g(1))$ represents the matrix, i.e. the crystalline polypropylene homopolymer, whereas the lower second glass transition temperature $(T_g(2))$ reflects the predominantly amorphous propylene copolymer of the heterophasic polypropylene composition.

Preferably the first glass transition temperature $T_g(1)$ is in the range of −3 to +3° C., more preferably in the range of −2 to +2° C.

The second glass transition temperature $T_g(2)$ is preferably in the range of −62 to −53° C., more preferably in the range of −60 to −54° C.

The heterophasic polypropylene composition of the present invention has a flexural modulus (FM) measured according to ISO 178 on an injection moulded specimen of 80×10×4 mm$^3$ in the range of 800 to 1700 MPa, preferably in the range of 830 to 1650 MPa and more preferably in the range of 850 to 1600 MPa.

Furthermore the heterophasic polypropylene composition of the present invention preferably fulfils the inequation $$FM[MPa]>1660-33.4*XCS[wt\%]$$

wherein XCS is the total fraction soluble in xylene (XCS) determined at 25° C. according ISO 16152 of the heterophasic polypropylene composition.

The Charpy notched impact strength of the heterophasic polypropylene composition at 23° C. as measured according to ISO 179-1eA is in the range of 4.0 to 80.0 kJ/m$^2$, preferably in the range of 4.5 to 75.0 kJ/m$^2$ and more preferably in the range of 5.0 to 70.0 kJ/m$^2$.

The Charpy notched impact strength of the heterophasic polypropylene composition at −20° C. as measured according to ISO 179-1eA is preferably in the range of 3.0 to 10.0 kJ/m$^2$, preferably in the range of 3.5 to 9.0 kJ/m$^2$ and more preferably in the range of 3.8 to 8.5 kJ/m$^2$.

The heterophasic polypropylene composition of the present invention has a VOC value measured according to VDA 278:2002 of equal or below 250 ppm, preferably equal or below 220 ppm and more preferably equal or below 200 ppm.

VOC is the amount of volatile organic compounds (VOC) [in ppm].

The heterophasic polypropylene composition of the present invention has a FOG value measured according to VDA 278:2002 of equal or below 300 ppm, preferably equal or below 280 ppm and more preferably equal or below 260 ppm.

FOG is the amount of fogging compounds (FOG) [in ppm].

Furthermore the heterophasic polypropylene composition of the present invention preferably fulfils the inequation $$VOC[ppm]<110+7.0*MFR_T[g/10min]$$

wherein $MFR_T$ is the total melt flow rate of said composition as determined at 230° C. and 2.16 kg load according ISO 1133.

In a preferred embodiment the heterophasic polypropylene composition is preferably free of phthalic acid esters as well as their respective decomposition products, i.e. phthalic acid esters, typically used as internal donor of Ziegler-Natta catalysts used for its production. Preferably, the heterophasic polypropylene composition is free of phthalic compounds as well as their respective decomposition products, i.e. phthalic compounds typically used as internal donor of Ziegler-Natta catalysts.

The term "free of" phthalic acid esters, preferably phthalic compounds, in the meaning of the present invention refers to a heterophasic polypropylene composition in which no phthalic acid esters as well no respective decomposition products, preferably no phthalic compounds as well as no respective decomposition products at all originating from the Ziegler-Natta catalyst are detectable.

The heterophasic polypropylene composition of the present invention is composed of components (A) and (B) and optional components (C) and (D).

Component (A) is present in an amount of from 70 to 90 wt %, preferably from 73 to 87 wt % and more preferably from 74 to 86 wt %

Component (B) is present in an amount of from 30 to 10 wt %, preferably from 27 to 13 wt % and more preferably from 26 to 14 wt %.

Component (C) is present in an amount of from 0 to 5.0 wt %, preferably from 0.1 to 4.0 wt % and more preferably from 0.2 to 3.0 wt %.

Component (D) is present in an amount of from 0 to 1.0 wt %, preferably from 0 to 0.8 wt % and more preferably from 0 to 0.5 wt %.

The sum of fractions (A), (B), (C) and (D) is 100 wt % or lower depending on the presence of further fractions or additives. The ranges in percent by weight (wt %) as used herein define the amount of each of the fractions or components based on the entire heterophasic polypropylene composition according to the present invention. All fractions and components together give a sum of 100 wt %.

The heterophasic polypropylene composition according to the present invention apart from the polymeric components and the α-nucleating agent (D) may comprise further non-polymeric components, e.g. additives for different purposes.

The following are optional additives: process and heat stabilisers, pigments and other colouring agents allowing retaining transparency, antioxidants, antistatic agents, slip agents, antiblocking agent, UV stabilisers and acid scavengers.

Depending on the type of additive, these may be added in an amount of 0.001 to 2.0 wt %, based on the weight of the heterophasic polypropylene composition.

Preparation of the Heterophasic Polypropylene Composition

The heterophasic polypropylene composition can be produced in a multistage process comprising at least two reactors connected in series, wherein the polypropylene homopolymer matrix (A) is produced first and in a subsequent step the propylene copolymer (B) is produced in the presence of the matrix (A) or by blending the matrix polymer (A) with the propylene copolymer (B) after their polymerization.

However, more desirably, the heterophasic polypropylene composition is produced in a multistage process.

In a particular preferred embodiment the polypropylene homopolymer matrix (A) is produced in at least one slurry reactor and subsequently the propylene copolymer (B) is produced in at least one gas phase reactor.

Accordingly the heterophasic polypropylene composition of the instant invention can be typically produced in a cascade of at least 2 reactors up to 3 reactors with an optional 4$^{th}$ reactor, where the first reactor is a liquid bulk reactor preferably of loop design and all subsequent reactors are gas phase reactors, preferably of fluidized bed design.

Preferably the components produced in the first two reactors are crystallizable propylene homopolymers (obtaining the matrix), while the component produced in the third reactor is a predominantely amorphous copolymer with higher amounts of comonomer. Optionally a further component can be produced in the fourth reactor, which is either also a predominantely amorphous copolymer or a crystalline ethylene homo- or copolymer.

According to a specific embodiment, only three reactors are utilized with either the second reactor being bypassed or the fourth reactor not being utilized.

According to another specific embodiment, only the first and the third reactor are utilized.

It is preferred that
(a) in a first reactor propylene is polymerized obtaining a first propylene homopolymer fraction,
(b) transferring said first propylene homopolymer fraction in a second reactor,
(c) polymerizing in said second reactor in the presence of the first propylene homopolymer fraction further propylene obtaining a second propylene homopolymer fraction, said first propylene homopolymer fraction and said second propylene homopolymer fraction form the matrix (A),
(d) transferring said matrix (A) in a third reactor,
(e) polymerizing in said third reactor in the presence of the matrix (A) propylene and ethylene and/or $C_4$ to $C_{10}$ α-olefin obtaining an predominantly amorphous propylene copolymer (B), said matrix (A) and said predominantly amorphous propylene copolymer (B) form the heterophasic polypropylene composition.

By using—as stated above—a loop reactor and at least one gas phase reactor in serial configuration and working at different conditions, a multimodal (e.g. bimodal) propylene homopolymer matrix (A) can be obtained.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second reactor and the third reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor are gas phase reactors. Accordingly for the instant process at least three, preferably three polymerization reactors, namely a slurry reactor, like loop reactor, a first gas phase reactor and a second gas phase reactor are connected in series are used. If needed prior to the slurry reactor a pre-polymerization reactor is placed.

A preferred multistage process is a "loop-gas phase"-process, as developed by Borealis (known as BORSTAR® technology) and is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic polypropylene composition as defined above the conditions for the first reactor, i.e. the slurry reactor, like a loop reactor, may be as follows:

the temperature is within the range of 50° C. to 110° C., preferably between 60° C. and 100° C., more preferably between 68 and 95° C., the pressure is within the range of 20 bar to 80 bar, preferably between 40 bar and 70 bar, hydrogen can be added for controlling the molar mass in a manner known per se.

Subsequently, the reaction mixture of the first reactor is transferred to the second reactor, i.e. gas phase reactor, where the conditions are preferably as follows:

the temperature is within the range of 50° C. to 130° C., preferably between 60° C. and 100° C., the pressure is within the range of 5 bar to 50 bar, preferably between 15 bar and 35 bar, hydrogen can be added for controlling the molar mass in a manner known per se.

The condition in the third reactor is similar to the second reactor.

The residence time can vary in the three reactor zones.

In one embodiment of the process for producing the heterophasic polypropylene composition the residence time in bulk reactor, e.g. loop is in the range 0.1 to 3.5 hours, e.g. 0.15 to 3.0 hours and the residence time in gas phase reactor will generally be 0.2 to 6.0 hours, like 0.5 to 5.0 hours.

If desired, the polymerization may be effected in a known manner under supercritical conditions in the first reactor, i.e. in the slurry reactor, like in the loop reactor, and/or as a condensed mode in the gas phase reactors.

Preferably, the process comprises also a prepolymerization step with the catalyst system, as described in detail below, comprising a Ziegler-Natta procatalyst, an external donor and optionally a cocatalyst.

In a preferred embodiment, the prepolymerization step is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic polypropylene composition is obtained by a multistage polymerization process, as described above, in the presence of a catalyst system.

As pointed out above in the specific process for the preparation of the heterophasic polypropylene composition as defined above, a specific Ziegler-Natta catalyst must be used.

Accordingly, the Ziegler-Natta catalyst will be now described in more detail.

The catalyst used in the present invention is a solid Ziegler-Natta catalyst, which comprises compounds of a transition metal of Group 4 to 6 of IUPAC, like titanium, a Group 2 metal compound, like a magnesium, and an internal donor being preferably a non-phthalic compound, more preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or MgCl2, but the catalyst is self-supported.

The Ziegler-Natta catalyst (ZN-C) can be further defined by the way as obtained.

Accordingly, the Ziegler-Natta catalyst (ZN-C) is preferably obtained by a process comprising the steps of a)
- $a_1$) providing a solution of at least a Group 2 metal alkoxy compound (Ax) being the reaction product of a Group 2 metal compound and a monohydric alcohol (A) comprising in addition to the hydroxyl moiety at least one ether moiety optionally in an organic liquid reaction medium; or
- $a_2$) a solution of at least a Group 2 metal alkoxy compound (Ax') being the reaction product of a Group 2 metal compound and an alcohol mixture of the monohydric alcohol (A) and a monohydric alcohol (B) of formula ROH, optionally in an organic liquid reaction medium; or
- $a_3$) providing a solution of a mixture of the Group 2 alkoxy compound (Ax) and a Group 2 metal alkoxy compound (Bx) being the reaction product of a Group 2 metal compound and the monohydric alcohol (B), optionally in an organic liquid reaction medium; or
- $a_4$) providing a solution of Group 2 alkoxide of formula $M(OR_1)_n(OR_2)_m X_{2-n-m}$ or mixture of Group 2 alkoxides $M(OR_1)_n X_{2-n'}$ and $M(OR_2)_m X_{2-m'}$, where M is Group 2 metal, X is halogen, $R_1$ and $R_2$ are different alkyl groups of $C_2$ to $C_{16}$ carbon atoms, and $0 \leq n < 2$, $0 \leq m < 2$ and $n+m+(2-n-m)=2$, provided that both n and $m \neq 0$, $0 < n' \leq 2$ and $0 < m' \leq 2$; and b) adding said solution from step a) to at least one compound of a transition metal of Group 4 to 6 and c) obtaining the solid catalyst component particles, and adding an internal electron donor, preferably a non-phthalic internal donor, at any step prior to step c).

The internal donor or precursor thereof is added preferably to the solution of step a).

According to the procedure above the Ziegler-Natta catalyst can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c).

In emulsion-solidification method in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The non-phthalic internal donor used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 $g/m^2$, more preferably below 10 $g/m^2$. Typically the amount of Ti is 1 to 6 wt %, Mg 10 to 20 wt % and donor 10 to 40 wt % of the catalyst composition.

Detailed description of preparation of catalysts is disclosed in WO 2012/007430, EP2610271, EP 261027 and EP2610272 which are incorporated here by reference.

The Ziegler-Natta catalyst is preferably used in association with an alkyl aluminum cocatalyst and optionally external donors.

As further component in the instant polymerization process an external donor is preferably present. Suitable external donors include certain silanes, ethers, esters, amines, ketones, heterocyclic compounds and blends of these. It is especially preferred to use a silane. It is most preferred to use silanes of the general formula

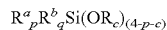

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula

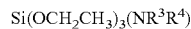

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors are the dicyclopentyl dimethoxy silane donor (D-donor) or the cyclohexylmethyl dimethoxy silane donor (C-Donor).

In addition to the Ziegler-Natta catalyst and the optional external donor a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst is a trialkylaluminium, like triethylaluminium (TEAL), dialkyl aluminium chloride or alkyl aluminium dichloride or mixtures thereof. In one specific embodiment the co-catalyst is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25; and optionally
(b) the mol-ratio of co-catalyst (Co) to titanium compound (TC) [Co/TC] must be in the range of above 80 to 500, preferably is in the range of 100 to 350, still more preferably is in the range of 120 to 300.

The heterophasic polypropylene composition according to this invention is preferably produced in the presence of
(a) a Ziegler-Natta catalyst comprising compounds (TC) of a transition metal of Group 4 to 6 of IUPAC, a Group 2 metal compound and an internal donor, wherein said internal donor is a non-phthalic compound, preferably is a non-phthalic acid ester and still more preferably is a diester of non-phthalic dicarboxylic acids;
(b) optionally a co-catalyst (Co), and
(c) optionally an external donor (ED).

It is preferred that the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate. Additionally or alternatively, the molar-ratio of co-catalyst (Co) to external donor (ED) [Co/ED] is 5 to 45.

If the heterophasic polypropylene composition according to this invention comprises also component (D), an alpha-nucleating agent, the heterophasic polypropylene composition is subsequently alpha nucleated.

The α-nucleating agent and optionally further additives are added to the heterophasic polypropylene composition, which is collected from the final reactor of the series of reactors. In case the heterophasic polypropylene composition is prepared by compounding of the fractions defined above, any additives may be added together or after said compounding step.

Preferably, these additives are mixed into the composition prior to or during the extrusion process in a one-step compounding process. Alternatively, a master batch may be formulated, wherein the heterophasic polypropylene composition is first mixed with only some of the additives.

For mixing, a conventional compounding or blending apparatus, e.g. a Banbury mixer, a 2-roll rubber mill, Buss-co-kneader or a twin screw extruder may be used. The twin screw extruder may be co-rotating or counter-rotating, preferably co-rotating. Preferably, the composition will be prepared by blending the additives together with the polymeric material at a temperature, which is sufficiently high to soften and plasticize the polymer. The temperatures and pressures used in the operation of the extruder are known in the art. Typically the temperature may be selected from the range of 150 to 350° C. The pressure used for extrusion preferably is 50 to 500 bar. The polymer materials recovered from the extruder are usually in the form of pellets. These pellets are then preferably further processed, e.g. by injection moulding to generate articles and products of the inventive compositions.

Use of Heterophasic Polypropylene Composition

According to a further embodiment of the invention the heterophasic polypropylene composition of the invention is used for the production of films, extruded, blow moulded or injection moulded articles, such as pouches and bags, pipes and fittings, transport packaging containers as well as components for car exteriors and interiors, like dashboards, door claddings, consoles, bumpers and trims.

Further, the present invention is also directed to an article made of the inventive polypropylene composition, particularly a film, an extruded, blow moulded or injection moulded article.

The article is produced by any common conversion process suitable for thermoplastic polymers like injection moulding, extrusion blow moulding, injection stretch blow moulding or cast film extrusion.

EXPERIMENTAL PART

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C\{^1H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

$$[mmmm]\% = 100*(mmmm/\text{sum of all pentads})$$

The presence of 2.1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2.1 erythro regio-defects was quantified using the average integral of the two characteristic methyl sites at 17.7 and 17.2 ppm:

$$P_{21e} = (I_{e6} + I_{e8})/2$$

The amount of 1.2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio-defects:

$$P_{total} = P_{12} + P_{21e}$$

The mole percent of 2.1 erythro regio-defects was quantified with respect to all propene:

$$[21e]\text{ mol.-}\% = 100*(P_{21e}/P_{total})$$

Comonomer Determination by NMR Spectroscopy

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol }\%] = 100*fE$$

The weight percent comonomer incorporation was calculated from the mole fraction:

$$E[\text{wt }\%] = 100*(fE*28.06)/((fE*28.06) + ((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The xylene soluble fraction at room temperature (XCS, wt %): The amount of the polymer soluble in xylene is determined at 25° C. according to ISO 16152; 5$^{th}$ edition; 2005 Jul. 1.

Intrinsic Viscosity (iV)

The intrinsic viscosity (V) value increases with the molecular weight of a polymer. The iV values e.g. of the XCS were measured according to ISO 1628/1 in decalin at 135° C.

DSC analysis, melting temperature ($T_m$), melting enthalpy ($H_m$), crystallization temperature ($T_c$) and crystallization enthalpy ($H_c$): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and crystallization enthalpy ($H_e$) are determined from the cooling step, while melting temperature ($T_m$) and melting enthalpy ($H_m$) are determined from the second heating step respectively from the first heating step in case of the webs.

The glass transition temperature Tg is determined by dynamic mechanical thermal analysis according to ISO 6721-7. The measurements are done in torsion mode on compression moulded samples (40×10×1 mm$_3$) between −100° C. and +150° C. with a heating rate of 2° C./min and a frequency of 1 Hz.

$MFR_2$ (230° C.) is measured according to ISO 1133 (230° C., 2.16 kg load)

The melt flow rate is measured as the $MFR_2$ in accordance with ISO 1133 15 (230° C., 2.16 kg load) for polypropylene and in accordance with ISO 1133 (190° C., 2.16 kg load) for polyethylene and is indicated in g/10 min. The MFR is an indication of the flowability, and hence the processability, of the polymer. The higher the melt flow rate, the lower the viscosity of the polymer.

The $MFR_2$ of a fraction (B) produced in the presence of a fraction (A) is calculated using the measured values of $MFR_2$ of fraction (A) and the mixture received after producing fraction (B) ("final"):

$$\frac{1}{(\log_{10} MFR_2(\text{final}))} = \frac{\text{weight fraction}(A)}{(\log_{10} MFR_2(A))} + \frac{\text{weight fraction}(B)}{(\log_{10} MFR_2(B))}$$

Charpy Notched Impact Strength

Charpy notched impact is measured according to ISO 179/1eA at +23° C. and at −20° C. using an injection moulded test specimen (80×10×4 mm) as produced according to ISO 1873.

Flexural Modulus: The flexural modulus was determined in 3-point-bending according to ISO 178 on 80×10×4 mm$^3$ test bars injection moulded at 23° C. in line with EN ISO 1873-2.

VOC/FOG Emission

The VOC/FOG emission was measured according to VDA 278:2002 on the granulated compounds. The volatile organic compounds are measured in toluene equivalents per gram sample (μgTE/g). The fogging is measured in hexadecane equivalents per gram sample (μgHD/g).

The measurements were carried out with a TDSA supplied by Gerstel using helium 5.0 as carrier gas and a column HP Ultra 2 of 50 m length and 0.32 mm diameter and 0.52 μm coating of 5% Phenyl-Methyl-Siloxane.

The VOC-Analysis was done according to device setting 1 listed in the standard using following main parameters: flow mode splitless, final temperature 90° C.; final time 30 min, rate 60K/min. The cooling trap was purged with a flow-mode split 1:30 in a temperature range from −150° C. to +280° C. with a heating rate of 12 K/sec and a final time of 5 min.

The following GC settings were used for analysis: 2 min isothermal at 40° C. heating at 3 K/min up to 92° C., then at 5 K/min up to 160° C., and then at 10 K/min up to 280° C., 10 minutes isothermal; flow 1.3 ml/min.

The VOC amounts account for $C_{10}$ to $C_{15}$ species.

The FOG analysis was done according to device setting 1 listed in the standard using following main parameters: flow-mode splitless, rate 60K/min; final temperature 120° C.; final time 60 min. The cooling trap was purged with a flow-mode split 1:30 in a temperature range from −150° C. to +280° C. with a heating rate of 12 K/sec. The following GC-settings were used for analysis: isothermal at 50° C. for 2 min, heating at 25 K/min up to 160° C., then at 10 K/min up to 280° C., 30 minutes isothermal; flow 1.3 ml/min.

The FOG amounts account for $C_{16}$ to $C_{30}$ species.

B. Examples

The catalyst used in the polymerization process for the heterophasic polypropylene composition of the inventive examples (IE 1 to 7) was prepared as follows:
Used Chemicals:
20% solution in toluene of butyl ethyl magnesium (Mg(Bu)(Et), BEM), provided by Chemtura
2-ethylhexanol, provided by Amphochem
3-Butoxy-2-propanol—(DOWANOL™ PnB), provided by Dow
bis(2-ethylhexyl)citraconate, provided by SynphaBase
$TiCl_4$, provided by Millenium Chemicals
Toluene, provided by Aspokem
Viscoplex® 1-254, provided by Evonik
Heptane, provided by Chevron
Preparation of the Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).
Preparation of Solid Catalyst Component 20.3 kg of $TiCl_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethyl-aluminium (TEAL) as co-catalyst and di(cyclopentyl) dimethoxy silane (D-donor) as donor.

The molar ratio of co-catalyst (Co) to external donor (ED) [Co/ED] and the molar ratio of co-catalyst (Co) to titanium compound (TC) [Co/TC] are indicated in table 1.

Polymerization was performed in a Borstar pilot plant, comprising a prepolymerization reactor, a loop reactor and two gas phase reactors. The polymerization conditions are also indicated in table 1.

from the liquid and washed six times with 300 ml heptane at 80° C. Then, the solid catalyst component was filtered and dried.

Catalyst and its preparation concept is described in general e.g. in patent publications EP 491566, EP 591224 and EP 586390.

As external donor di(cyclopentyl) dimethoxy silane (donor D) was used. CE1 and CE2 were produced by by-passing the $1^{st}$ GPR, i.e. in one loop and one GPR only.

TABLE 1

Polymerization of inventive examples

|  |  | Ex. 1 | Ex. 2 | Ex. 3 | Ex. 4 | Ex. 5 | Ex. 6 | Ex. 7 |
|---|---|---|---|---|---|---|---|---|
| Prepoly |  |  |  |  |  |  |  |  |
| Residence time | [h] | 0.35 | 0.35 | 0.35 | 0.35 | 0.37 | 0.37 | 0.37 |
| Temperature | [° C.] | 30 | 30 | 30 | 30 | 30 | 30 | 30 |
| Co/ED ratio | [mol/mol] | 8.1 | 8.0 | 8.11 | 8.17 | 8.19 | 8.15 | 7.7 |
| Co/TC ratio | [mol/mol] | 290 | 341 | 349 | 350 | 188 | 186 | 452 |
| Loop (R1) |  |  |  |  |  |  |  |  |
| Residence time | [h] | 0.35 | 0.35 | 0.34 | 0.33 | 0.31 | 0.3 | 0.54 |
| Temperature | [° C.] | 80 | 80 | 80 | 80 | 80 | 80 | 75 |
| $H_2/C_3$ ratio | [mol/kmol] | 0.99 | 0.63 | 0.62 | 0.61 | 3.36 | 3.36 | 8 |
| $MFR_2$ | [g/10 m]in | 3.32 | 3.29 | 2.97 | 3.2 | 20.5 | 22.1 | 47.1 |
| XCS | [wt %] | 3 | n.a. | n.a. | n.a. | 2.8 | n.a. | 2.8 |
| C2 content | [wt %] | 0 | 0 | 0 | 0 | 0 | 0 | 0 |
| split | [wt %] | 37 | 37 | 42 | 29 | 33 | 34 | 40 |
| 1st GPR (R2) |  |  |  |  |  |  |  |  |
| Residence time | [h] | 2.16 | 2.86 | 2.51 | 2.54 | 2.44 | 2.84 | 3.29 |
| Temperature | [° C.] | 80 | 80 | 80 | 80 | 80 | 80 | 80 |
| Pressure | [kPa] | 2800 | 2800 | 2800 | 2800 | 2800 | 2800 | 2600 |
| $H_2/C_3$ ratio | [mol/kmol] | 1.4 | 1.5 | 1.5 | 1.5 | 44.1 | 43.3 | 54.1 |
| $MFR_2$ ($MFR_M$) | [g/10 min] | 1.2 | 1.0 | 1.2 | 1.2 | 21.7 | 21.7 | 39.7 |
| XCS | [wt %] | 1.7 | 1.7 | 1.8 | 1.7 | 1.8 | 2.1 | 2.0 |
| C2 content | [wt %] | 0 | 0 | 0 | 0 | 0 | 0 | 0 |
| split | [wt %] | 48 | 48 | 46 | 51 | 50 | 50 | 47 |
| $2^{nd}$ GPR (R3) |  |  |  |  |  |  |  |  |
| Residence time | [h] | 0.52 | 0.68 | 0.59 | 0.69 | 1.02 | 0.99 | 4.68 |
| Temperature | [° C.] | 70 | 70 | 80 | 80 | 70 | 70 | 75 |
| Pressure | [kPa] | 2061 | 2041 | 2463 | 2077 | 2400 | 2301 | 2180 |
| $C_2/C_3$ ratio | [mol/kmol] | 852 | 863 | 838 | 847 | 614 | 641 | 512 |
| $H_2/C_2$ ratio | [mol/kmol] | 95.5 | 98.85 | 104.5 | 81.0 | 240.5 | 302.6 | 92.4 |
| $MFR_2$ ($MFR_T$) | [g/10 min] | 0.83 | 0.85 | 0.82 | 0.85 | 11.8 | 13.9 | 19.1 |
| C2 content | [wt %] | 10.6 | 10.75 | 14.1 | 16 | 11 | 9.9 | 8.5 |
| split | [wt %] | 15 | 15 | 12 | 20 | 17 | 16 | 13 |
| MFR ratio $MFR_T/MFR_M$ | — |  | 0.69 | 0.85 | 0.68 | 0.71 | 0.54 | 0.64 | 0.48 |

For the Comparative Examples CE1 to CE3 the following heterophasic polypropylene polymers were prepared as described below:

Catalyst Preparation

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered

TABLE 2

Polymerization of comparative examples

|  |  | CE1 | CE2 | CE3 |
|---|---|---|---|---|
| Prepoly |  |  |  |  |
| Residence time | [h] | 0.08 | 0.08 | 0.08 |
| Temperature | [° C.] | 28 | 28 | 28 |
| Co/ED ratio | [mol/mol] | 8.5 | 9.0 | 9.0 |
| Co/TC ratio | [mol/mol] | 90 | 120 | 120 |
| Loop (R1) |  |  |  |  |
| Residence time | [h] | 0.75 | 0.75 | 0.75 |
| Temperature | [° C.] | 70 | 70 | 70 |
| $H_2/C_3$ ratio | [mol/kmol] | 1.72 | 2.85 | 3.25 |
| $MFR_2$ | [g/10 m]in | 1.1 | 21 | 35 |
| XCS | [wt %] | 1.9 | 2.1 | 2.0 |
| C2 content | [wt %] | 0 | 0 | 0 |
| split | [wt %] | 80 | 78 | 43.5 |

TABLE 2-continued

Polymerization of comparative examples

|  |  | CE1 | CE2 | CE3 |
|---|---|---|---|---|
| 1st GPR (R2) |  |  |  |  |
| Residence time | [h] | n.a | n.a | 1.0 |
| Temperature | [° C.] | n.a | n.a | 80 |
| Pressure | [kPa] | n.a | n.a | 2400 |
| $H_2/C_3$ ratio | [mol/kmol] | n.a | n.a | 38.2 |
| $MFR_2$ | [g/10 min] | n.a | n.a | 35 |
| XCS | [wt %] | n.a | n.a | 2.0 |
| C2 content | [wt %] | n.a | n.a | 0 |
| split | [wt %] | n.a | n.a | 40 |
| 2$^{nd}$ GPR (R3) |  |  |  |  |
| Residence time | [h] | 1.5 | 1.5 | 1.0 |
| Temperature | [° C.] | 80 | 80 | 80 |
| Pressure | [kPa] | 2400 | 2400 | 2300 |
| $C_2/C_3$ ratio | [mol/kmol] | 545 | 510 | 630 |
| $H_2/C_2$ ratio | [mol/kmol] | 110 | 133 | 105 |

All resins were mixed in a twin-screw extruder with 0.1 wt % of Pentaerythrityl-tetrakis(3-(3',5'-di-tert. butyl-4-hydroxyphenyl)-propionate, (CAS-no. 6683-19-8, trade name Irganox 1010) supplied by BASF AG, 0.1 wt % Tris (2,4-di-t-butylphenyl) phosphate (CAS-no. 31570-04-4, trade name Irgafos 168) supplied by BASF AG, and 0.05 wt % Calcium stearate (CAS-no. 1592-23-0) supplied by Croda Polymer Additives.

The heterophasic polypropylene of Example Ex. 7 was further nucleated by the addition of talc (Steamic T1 CA of Luzenac, having a cutoff particle size ($d_{95}$) of 6.2 µm.) (Ex. 7-1) resp with Sodium 2,2'-methylene bis-(4,6-di-tert. butylphenyl) phosphate (Ex. 7-2) (NA11; Irgastab NA 11 UH supplied by BASF, CAS-no. 85209-91-2).

The nucleating agent was added in the above described compounding step in an amount of 1.0 wt % talc and 0.2 wt % NA 11.

The polymer properties are listed in Table 3 and Table 4:

TABLE 3

Polymer Properties of Inventive Examples Ex. 1 to Ex. 7

|  | unit | Ex. 1 | Ex. 2 | Ex. 3 | Ex. 4 | Ex. 5 | Ex. 6 | Ex. 7-1 | Ex. 7-2 |
|---|---|---|---|---|---|---|---|---|---|
| Properties |  |  |  |  |  |  |  |  |  |
| $MFR_2$ | [g/10 min] | 0.9 | 1.2 | 1.1 | 1.0 | 11.7 | 14.8 | 21 | 21 |
| <mmmm> NMR | [mol %] | 96.9 | 97.0 | 97.1 | 97.0 | 97.0 | 97.2 | 97.4 | 97.4 |
| Tm (PP, DSC) | [° C.] | 164 | 164 | 164 | 164 | 164 | 164 | 164 | 164 |
| Hm (PP, DSC) | [J/g] | 80 | 78 | 73 | 72 | 84 | 85 | 89 | 90 |
| Tm (PE, DSC) | [° C.] | 114 | 113 | 117 | 118 | 119 | 119 | 118 | 117 |
| Hm (PE, DSC) | [J/g] | 0.6 | 0.7 | 0.9 | 1.1 | 0.3 | 0.3 | 0.2 | 0.2 |
| Tc (DSC) | [° C.] | 118 | 119 | 119 | 119 | 118 | 119 | 123 | 128 |
| Tg (PP, DMA) | [° C.] | 1.5 | 1.4 | 1.2 | 1 | −0.5 | −0.9 | 0 | 0 |
| Tg (EPR, DMA) | [° C.] | −58 | −58 | −58 | −58 | −58 | −59 | −58 | −58 |
| XCS | [wt %] | 17.6 | 19.1 | 23 | 24.6 | 21 | 18.9 | 15.8 | 15.8 |
| C2 (XCS, NMR) | [wt %] | 45.9 | 48.1 | 43.5 | 44.8 | 42.9 | 46.5 | 40.1 | 40.1 |
| iV (XCS) | [dl/g] | 3.2 | 3.1 | 2.8 | 2.9 | 2.5 | 2.2 | 3.2 | 3.2 |
| FM ISO 178 | [MPa] | 1097 | 1058 | 913 | 873 | 1029 | 1067 | 1398 | 1457 |
| NIS ISO 179 1eA 23° C. | [kJ/m$^2$] | 36.3 | 31 | 55.4 | 64 | 7.9 | 6.0 | 8.4 | 7.9 |
| NIS ISO 179 1eA −20° C. | [kJ/m$^2$] | 4.2 | 4.3 | 6.6 | 8.1 | 3.9 | 3.1 | 3.7 | 3.9 |
| VOC (pellets) | [ppm] | 108 | 75 | 70 | 83 | 167 | 190 | n.m. | n.m. |
| FOG (pellets) | [ppm] | 104 | 53 | 50 | 45 | 250 | 250 | n.m. | n.m. |
| Relations |  |  |  |  |  |  |  |  |  |
| FM >1660 − 33.4XCS | — | 1072 | 1022 | 892 | 838 | 959 | 1029 | 1132 | 1132 |
| VOC <110 + 7.0MFR | — | 116 | 118 | 118 | 117 | 192 | 214 | — | — |

FM flexural modulus
n.m. not measured

TABLE 2-continued

Polymerization of comparative examples

|  |  | CE1 | CE2 | CE3 |
|---|---|---|---|---|
| $MFR_2$ ($MFR_T$) | [g/10 min] | 0.9 | 13 | 20 |
| C2 content | [wt %] | 15.5 | 8.3 | 7.5 |
| split | [wt %] | 20 | 22 | 16.5 |
| MFR ratio ($MFR_T/MFR_M$) | — | — | 0.82 | 0.62 | 0.57 |

The properties of the products obtained from the individual reactors naturally are not measured on homogenized material but on reactor samples (spot samples). The properties of the final resin are measured on homogenized material, the $MFR_2$ on pellets made thereof in an extrusion mixing process as described below.

TABLE 4

Polymer Properties of Comparative Examples CE1 to CE3

|  | unit | CE1 | CE2 | CE3 |
|---|---|---|---|---|
| Properties |  |  |  |  |
| $MFR_2$ | [g/10 min] | 1.2 | 13 | 18 |
| <mmmm> NMR | [mol %] | 96.2 | 96.8 | 96.4 |
| Tm (PP, DSC) | [° C.] | 165 | 165 | 164 |
| Hm (PP, DSC) | [J/g] | 97 | 121 | 94 |
| Tm (PE, DSC) | [° C.] | 117 | 118 | 116 |
| Hm (PE, DSC) | [J/g] | 1.2 | 0.3 | 2.2 |
| Tc (DSC) | [° C.] | 114 | 115 | 127 |
| Tg (PP, DMA) | [° C.] | 0.8 | −0.4 | −1 |
| Tg (EPR, DMA) | [° C.] | −55 | −54 | −59 |
| XCS | [wt %] | 17.0 | 18.0 | 11.5 |
| C2 (XCS, NMR) | [wt %] | 42.8 | 41.8 | 54.8 |
| iV (XCS) | [dl/g] | 2.0 | 2.4 | 3.0 |

TABLE 4-continued

Polymer Properties of Comparative Examples CE1 to CE3

|  | unit | CE1 | CE2 | CE3 |
|---|---|---|---|---|
| FM ISO 178 | [MPa] | 1050 | 1030 | 1260 |
| NIS ISO 179 1eA 23° C. | [kJ/m$^2$] | 28 | 6.3 | 7.0 |
| NIS ISO 179 1eA −20° C. | [kJ/m$^2$] | 2.5 | 2.9 | 3.5 |
| VOC (pellets) | [ppm] | 188 | 211 | n.m. |
| FOG (pellets) Relations | [ppm] | 260 | 384 | n.m. |
| FM >1660 − 33.4 * XCS | | — | 1092 | 1059 | 1276 |
| VOC <110 + 7.0 * MFR | | — | 118 | 201 | — |

From Table 3 and Table 4 it can be clearly seen that the inventive heterophasic polypropylene compositions have an improved stiffness/impact balance over the comparative examples.

From FIGS. 1 and 2 it can be further seen that the Comparative Examples do not meet the requirements related to the inequations of FM>1660−33.4*XCS and VOC<110+7.0*MFR

The invention claimed is:

1. A heterophasic polypropylene composition comprising:
   (A) 70 to 90 wt % of a crystalline isotactic propylene homopolymer matrix having a pentad concentration as determined by $^{13}$C-NMR spectroscopy of more than 96 mol % and a matrix melt flow rate (MFR$_M$) as determined at 230° C. and 2.16 kg load according ISO 1133 in the range of 0.5 to 50 g/10 min,
   (B) 10 to 30 wt % of a predominantly amorphous propylene copolymer with 32 to 50 wt % of ethylene and/or an α-olefin with 4-10 carbon atoms, being present in the composition as dispersed particles, and
   (C) 0 to 5.0 wt % of a crystalline ethylene copolymer with an α-olefin with 3-10 carbon atoms being present in the composition as inclusions of the dispersed particles of (B),
   (D) 0 to 1.0 wt % of an alpha nucleating agent for the α- and/or γ-phase of isotactic polypropylene,
   said composition being further characterized by a total melt flow rate (MFR$_T$) as determined at 230° C. and 2.16 kg load according ISO 1133 in the range of 0.5 to 45 g/10 min, a fraction soluble in xylene (XCS) determined at 25° C. according ISO 16152 in the range of 11 to 27 wt %, and ratio of MFR$_T$/MFR$_M$ of ≥1.0, and
   wherein said composition has a crystalline polypropylene content with a melting point (T$_{m1}$) from DSC analysis according ISO 11357 in the range of 160 to 170° C. whereby the associated melting enthalpy (H$_{m1}$) is in the range of 70 to 100 J/g and optionally a crystalline polyethylene content with a melting point (T$_{m2}$) from DSC analysis according ISO 11357 in the range of 105 to 130° C. whereby the associated melting enthalpyl (H$_{m2}$) is less than 7.0 J/g.

2. A heterophasic polypropylene composition according to claim 1, wherein the intrinsic viscosity of the XCS fraction as measured according to DIN ISO 1628/1 in decalin at 135° C. is in the range of 1.2 to 4.5 dl/g and wherein the comonomer content, of the XCS fraction is in the range of 35.0 to 52.0 wt %.

3. A heterophasic polypropylene composition according to claim 1, wherein a flexural modulus determined according to ISO 178 (FM) on an injection moulded specimen of 80×10×4 mm$^3$ is in the range of 800 to 1700 MPa and furthermore fulfilling the inequation:

FM[MPa]>1660−33.4*XCS[wt %]

wherein XCS is the total fraction soluble in xylene (XCS) determined at 25° C. according ISO 16152 of the heterophasic polypropylene composition.

4. A heterophasic polypropylene composition according to claim 1, having a Charpy notched impact strength at +23° C. as measured according to ISO 179-1eA in the range of 4.0 to 80.0 kJ/m$^2$ and a Charpy notched impact strength at −20° C. as measured according to ISO 179-1eA in the range of 3.0 to 10.0 kJ/m$^2$.

5. A heterophasic polypropylene composition according to claim 1, having a total comonomer content defined as the sum of contents of ethylene and α-olefins with 4-10 carbon atoms in the range of 3.5 to 17.0 wt %.

6. A heterophasic polypropylene composition according to claim 1, wherein at least two glass transition points (T$_g$) as determined by dynamic mechanical thermal analysis according ISO 6721-7, with one T$_g$ (T$_g$(1)) associated to the crystalline isotactic propylene homopolymer matrix being in the range of −4 to 4° C. and another T$_g$ (T$_g$(2)) associated to the predominantly amorphous propylene copolymer being in the range of −65 to −50° C.

7. A heterophasic polypropylene composition according to claim 1, further comprising 0.0001 to 1.0 wt % of a nucleating agent for the α- and/or γ-phase of isotactic polypropylene and having a crystallization temperature from DSC analysis according ISO 11357 of more than 120° C.

8. A heterophasic polypropylene composition according to claim 1, comprising a content of volatiles (VOC) as determined according to VDA 278:2002 of less than 250 ppm and furthermore fulfilling the inequation:

VOC[ppm]<110+7.0*MFR$_T$[g/10min]

wherein MFR$_T$ is the total melt flow rate in g/10 min of said composition as determined at 230° C. and 2.16 kg load according ISO 1133.

9. A heterophasic polypropylene composition according to claim 1, wherein the composition has been polymerized in the presence of:
   a) a Ziegler-Natta catalyst comprising compounds (TC) of a transition metal of Group 4 to 6 of IUPAC, a Group 2 metal compound and an internal donor, wherein said internal donor is a non-phthalic compound;
   b) a co-catalyst (Co), and
   c) optionally an external donor (ED).

10. A propylene polymer composition according to claim 9, wherein said internal donor is selected from the group comprising malonates, maleates, succinates, citraconates, glutarates, cyclohexene-1,2-dicarboxylates and benzoates, and any derivatives and/or mixtures thereof.

11. A heterophasic polypropylene composition according to claim 9, wherein compounds (TC) of a transition metal of Group 4 to 6 is a titanium compound and wherein the molar ratio of co-catalyst (Co) to external donor (ED) [Co/ED] is in the range of 5 to 45, and the molar ratio of co-catalyst (Co) to titanium compound (TC) [Co/TC] is in the range of above 80 to 500.

* * * * *